United States Patent [19]

Revay

[11] 4,436,159

[45] Mar. 13, 1984

[54] MANUAL/ELECTRIC ACTIVATED SQUIB ACTUATED DISCHARGE VALVE FOR FIRE EXTINGUISHERS

[75] Inventor: Blaise Revay, San Marino, Calif.

[73] Assignee: Kidde, Inc., Clifton, N.J.

[21] Appl. No.: 260,132

[22] Filed: May 1, 1981

[51] Int. Cl.³ ............................................. A62C 35/02
[52] U.S. Cl. .................................. 169/28; 220/89 A; 137/68 A
[58] Field of Search ....................... 169/26, 28, 62, 56, 169/58, 19, 89, 72, 30; 222/5; 220/89 A, 89 R, 261; 137/68 A, 68 R

[56] References Cited

U.S. PATENT DOCUMENTS

| | | | |
|---|---|---|---|
| 1,992,276 | 2/1935 | Zieschang | 169/26 |
| 2,884,076 | 4/1959 | Mathisen | 169/28 |
| 3,369,609 | 2/1968 | Fogelgren | 169/26 |
| 3,494,370 | 2/1970 | Wahl et al. | 220/261 |
| 3,820,607 | 6/1974 | Miley | 169/26 |
| 4,046,156 | 9/1977 | Cook | 169/28 |

Primary Examiner—Joseph J. Rolla
Assistant Examiner—Kenneth Noland
Attorney, Agent, or Firm—Darby & Darby

[57] ABSTRACT

A discharge valve adapted to be affixed to a container housing pressurized fire extinguishing materials. The discharge valve is opened by activating an explosive squib to provide a shock wave which destroys a diaphragm sealing the contents of the fire extinguishing fluid within the container or housing therefor. There are two explosive squibs, one of which may be electrically operated and the other of which may be manually operated.

4 Claims, 4 Drawing Figures

MANUAL/ELECTRIC ACTIVATED SQUIB ACTUATED DISCHARGE VALVE FOR FIRE EXTINGUISHERS

BACKGROUND OF THE INVENTION

It has long been known to release fire extinguishing fluid retained under pressure within a container by means of a shock wave generated through the medium of activation of an explosive squib. For example, see U.S. Pat. Nos. 3,491,783 and 3,552,495. As is noted in Patent 3,491,783 the squib is used to activate a knife which cuts a sealed diaphragm to thereby release the pressurized fluid whereas in U.S. Pat. No. 3,552,495, the diaphragm is broken by the shock wave directly. The present invention is directed to the latter type of concept and is an improvement thereover.

Under certain applications it has been found that a fire extinguisher reliant upon application of electrical current for activation of the explosive squib will sometimes fail if the electrical current source fails or, for some reason, the electrical circuit continuity is interrupted. It has therefore been determined that an alternative means for operating the fire extinguisher is desirable as a backup to thereby increase reliability of the fire extinguishing system.

SUMMARY OF THE INVENTION

The discharge valve of the present invention includes a frangible diaphragm for releasing pressurized fire extinguishing fluid from a container therefor upon rupture of the diaphragm. To rupture the diaphragm there is provided first and second explosive squibs which are mounted upon a support means and positioned to rupture the diaphragm upon firing of either one of the squibs. Means is provided for selectively firing one of the first and second squibs at a time and there is also provided means for isolating the shock wave generated by the firing of one of the squibs from the other of the squibs to thereby preclude an unwanted detonation of the unfired squib and to leave the unfired squib undamaged and still useful.

In accordance with a more specific aspect of the present invention one of the squibs is adapted for firing by application of an electrical current thereto, while the other of the squibs is adapted for percussive firing by application of a blow thereto through an impact generating means.

DETAILED DESCRIPTION OF THE INVENTION

Figure 1:
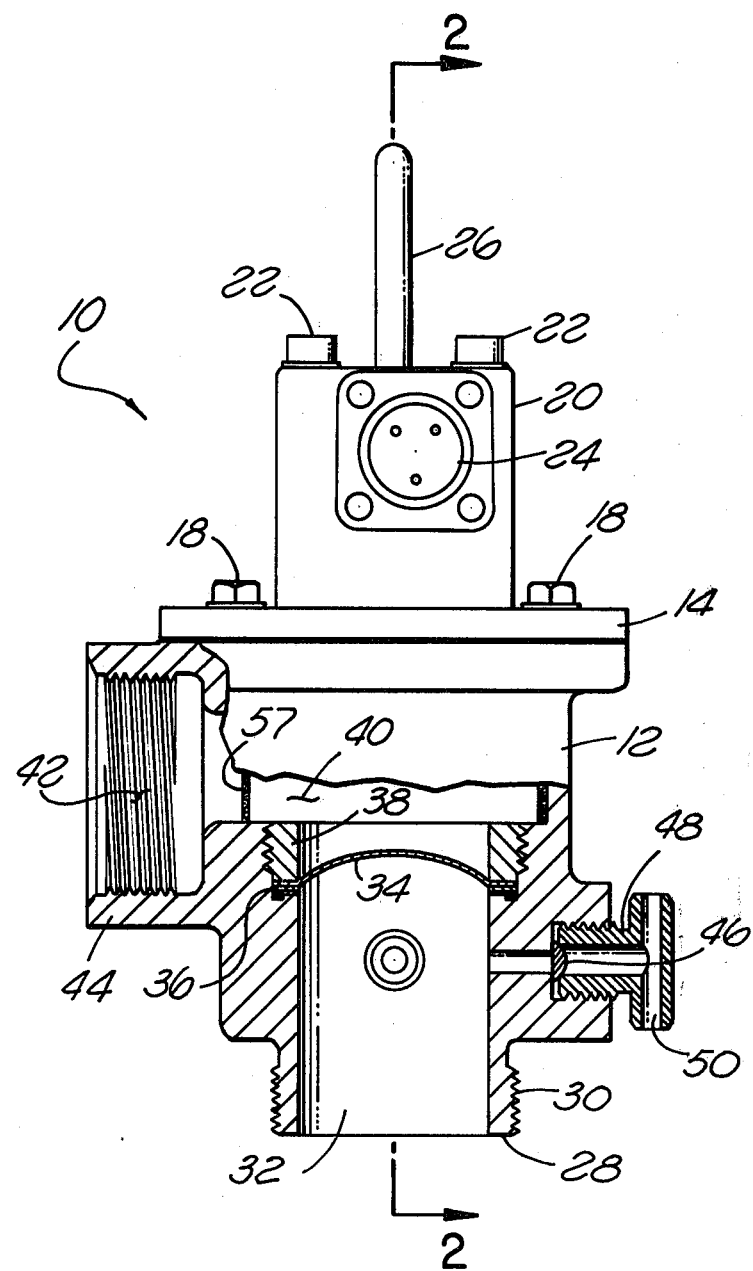
FIG. 1 is an elevational view, partly broken away, of a discharge valve constructed in accordance with the present invention.

Referring now more particularly to FIG. 1, a discharge valve 10 constructed in accordance with the present invention is shown. The discharge valve 10 includes a body 12 and a mounting plate 14 including a squib retaining means (FIG. 2) and held in place by fasteners such as screws 18 or the like. A cover plate 20 is attached to the mounting plate 14 by appropriate fastening means such as screws or rivets 22 as may be desired. An electrical connector 24 is provided to conduct an electrical signal from a source thereof (not shown) to an electrically actuated explosive squib as will be described more fully below. A lever 26 is also provided for manual actuation of an explosive squib as will also be more fully described below.

The body 12 includes an extension 28 having threads 30 and a port 32. The extension 28 is threadably attached to a container (not shown) of pressurized fire extinguishing material. The port 32 is closed by a frangible diaphragm 34 which is sealed about its periphery by means of an appropriate thin disc of copper 36 which is crushed by the screw threaded ring 38 to provide a seal as is well known in the art. When one of the twin explosive cartridges is activated the frangible diaphragm 34 is destroyed thereby connecting the container with a chamber 40 which in turn is connected to a port 42 by way of the protrusion 44 which may have an appropriate conduit connected thereto for directing the contents of the fire extinguisher to the desired area such as an aircraft engine or the like as is well known in the art.

A pressure relief valve 45 is provided in the form of a burst disc 46 and a fitting 48 which discharges the contents of the fire extinguisher through appropriate passageways 50 in the event of overpressure.

Figure 2:
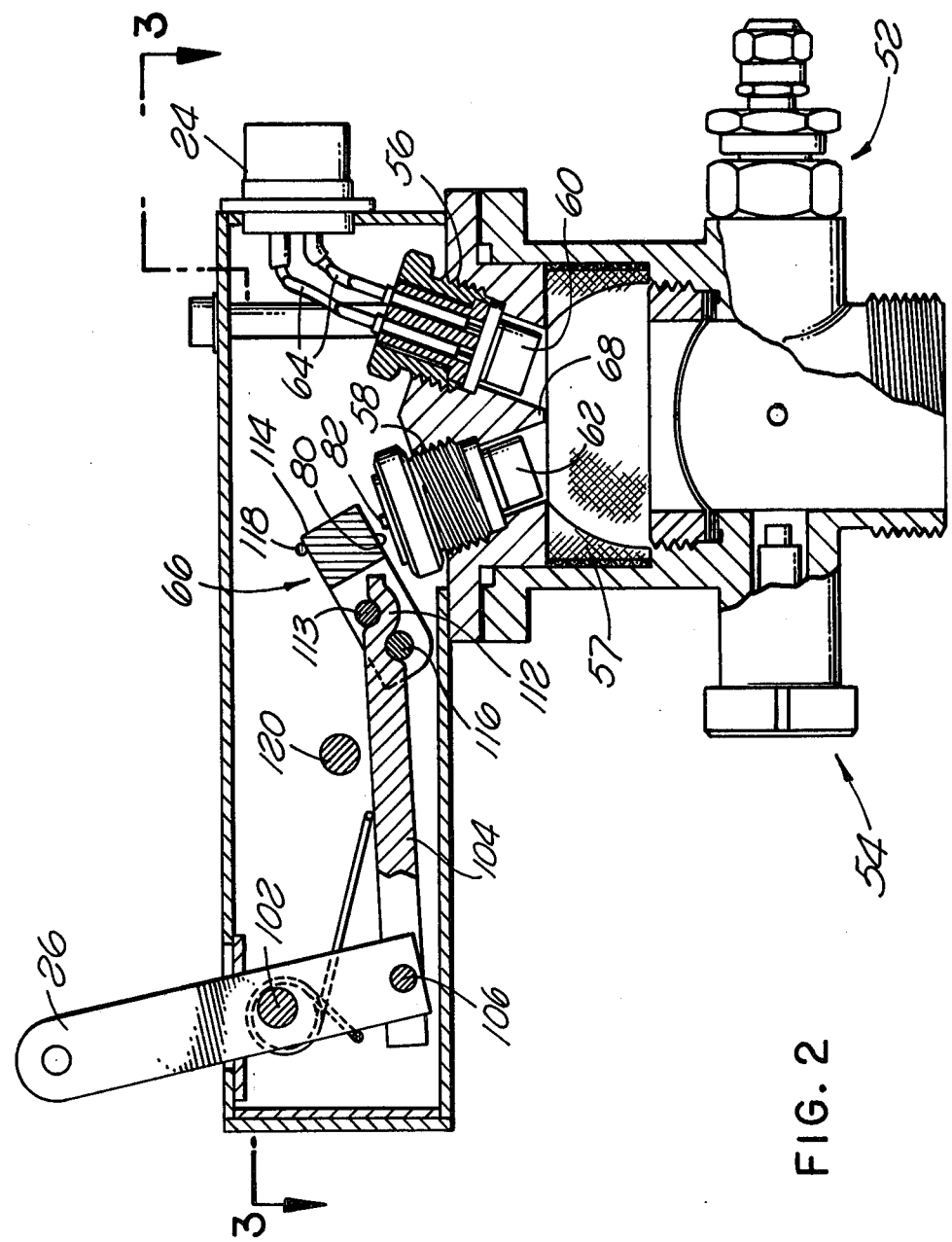
FIG. 2 is a cross sectional view taken about the lines 2—2 of FIG. 1.

By referring more particularly to FIG. 2 there is disclosed in further detail the construction of the discharge valve in accordance with the present invention. As is therein illustrated the discharge valve includes a filling port assembly 52 and a gauge 54 each as is well known in the art. Also provided in accordance with well known principles of the art is a screen 57 which catches particles of the diaphragm 34 and the explosive squibs after actuation to prevent them from being transmitted to the area of the fire through the port 42.

The plate 14 is formed to define threaded apertures 56 and 58. Explosive squibs 60 and 62 are received within the apertures 56 and 58, respectively. The explosive squib 60 is adapted to be electrically actuated by application of an electrical current thereto by way of the leads 64 which receive an electrical signal through the connector assembly 24. An impact means assembly 66, when actuated, applies percussive force to the end of the squib 62, thereby actuating through percussion. An isolating barrier 68 is provided between squibs 60 and 62. The isolating barrier 68 serves to preclude the shock waves generated by either of the explosive squibs 60 and 62 from damaging or actuating the other explosive squib when such is not desired. That is, it is the intent in accordance with the present invention that either of the two squibs 60 or 62 may be selectively activated or fired as desired either by an electrical or a mechanical signal without disturbing the other squib. To preclude such an occurrence, while at the same time directing the shock wave generated by the explosive squib to the frangible diaphragm 34, a barrier must be inserted between the squibs and thus the barrier 68 is provided. The barrier 68 may be formed integrally with the plate 14 as shown in FIG. 2, or alternatively may be formed as a separate piece and attached to the plate 14 if such is desired. The barrier 68 must have sufficient thickness and be formed of material such as to withstand the shock waves generated by the explosive squibs upon actuation thereof.

In accordance with the preferred embodiment of the present invention, the entire plate may be formed, as by casting, of an aluminum alloy such as 356T6 which may then be machine finished to provide the desired configuration and threads to receive the squibs. The barrier 68 should extend at least flush with the end of the squibs and preferably a slight distance beyond the end of the squibs to isolate the shock waves as above described. In addition thereto the barrier must extend in a direction laterally between the squibs sufficient to block the shock waves generated by the actuated squib from the nonactuated squib. The particular length of extension of the barrier 68 is dependent upon the spacing between the squib 60 and 62 and the particular angle at which they are disposed. The closer the two squibs the further the barrier must extend and in any event it should extend sufficiently distant to block the line of sight from the actuated squib to the nonactuated squib. In any event it has been determined that no more than a 180 degree sweep of the barrier 68 is required to totally block the shock waves from the actuated squib to the nonactuated squib as desired.

Figure 4:
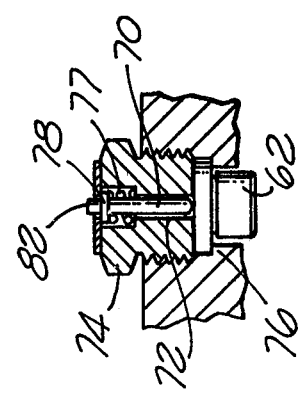
FIG. 4 is a fragmentary cross sectional view of the percussive firing assembly for use in the structure illustrated in FIGS. 1 and 2.

As is shown in FIGS. 2 and 4 the percussive firing pin assembly 66 may include a firing pin 70 which is retained within a bore 72 formed within a plug 74 which is threaded into the threaded bore 58. The bore is terminated by a shoulder 76 against which the squib 62 seats. The squib is held in place by the plug 74 securing the squib 62 against the shoulder 76. The firing pin 70 is held out of contact with the upper surface of the squib 62 by spring means 77 while the pin 70 is held within the body of the plug 74 by a retaining washer 78 which is secured to the top of the plug 74. A hammer 114 is pivotally positioned above the pin 70 and upon arming and triggering thereof the surface 80 impacts the top 82 of the pin 70 driving it downwardly into contact with the upper surface of the squib 62 and through sufficient force percussively ignites the squib 62 causing it to generate the desired shock wave to fracture the frangible diaphragm 34.

Figure 3:
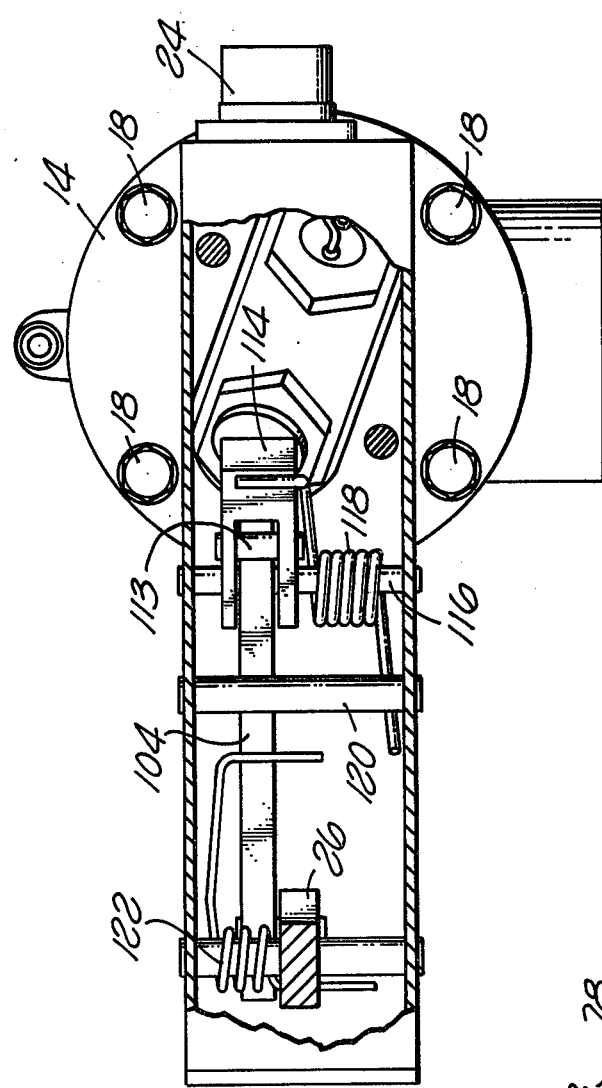
FIG. 3 is a top view, partly in cross section taken about the lines 3—3 of FIG. 2, further illustrating the impact generating means assembly.

The impact generating means may take various forms. One form which it may take is as shown in FIGS. 2 and 3 to which reference is hereby made. As is therein shown the lever 26 is pivoted about a rod 102 and in turn is pivotally secured to an arm 104 by means of a pin 106. Upon movement of the lever 26 toward the right as viewed in FIG. 3, the arm 104 moves toward the left causing the hook-like projection 112 which engages the pin 113 secured on the hammer 114 to rotate the hammer 114 counterclockwise about the pivot pin 116 to which it is pivotally secured. The spring 118 is thus wound up and upon release of the pin 113 from the projection 112, the spring 118 returns the hammer clockwise causing the firing pin 70 to strike the top of the squib 62.

A stop bar 120 retains arm 104 in position and the spring 122 returns arm 26 to the position shown in FIG. 2 upon its release.

Other firing mechanisms and arrangements will become apparent to those skilled in the art and may be employed without departing from the spirit and scope of the present invention. The only requirement is that the percussive force generated as a result of the firing mechanism be sufficiently strong upon manual actuation thereof to fire the explosive squib, thereby generating the shock wave to rupture the diaphragm 34.

There has thus been disclosed a dual squib electrical/mechanical activated discharge valve for a fire extinguisher adapted in such a manner that the valve may be activated either electrically or mechanically as selectively desired.

I claim:

1. An improved dual squib discharge valve for a container housing pressurized fire extinguishing fluid and having a frangible diaphragm for releasing said fluid upon rupture thereof and further including first and second squibs, said first squib being actuated by an electric current source, means for connecting said electrical current source to said first squib upon command, impact means, means for mechanically actuating said impact means to fire said second squib upon command, wherein the improvement comprises:

plate means having first and second screw threaded apertures therein adapted to receive said first and second squibs respectively; and said plate means includes a generally V-shaped protrusion extending between and beyond the active ends of said first and second squibs to block the line of sight therebetween when said squibs are fully seated in their respective threaded apertures wherein said protrusion isolates shock waves generated by firing of one of said squibs from the other of said squibs to substantially prevent unwanted detonation of or damage to the unfired squib.

2. A dual squib discharge valve as defined in claim 1 wherein said protrusion is an integral part of said plate means.

3. A dual squib discharge valve as defined in claim 1 wherein said impact means includes a firing pin;

means holding said firing pin out of engagement with said second squib except when said second squib is to be fired;

hammer means;

means for arming said hammer means; and means for releasing said hammer means after arming thereof to strike said firing pin to percuss said second squib.

4. A dual squib discharge valve as defined in claim 1 wherein said isolating means further comprises means for directing said shock wave from said fired squib toward said diaphragm.

* * * * *